Patented June 1, 1937

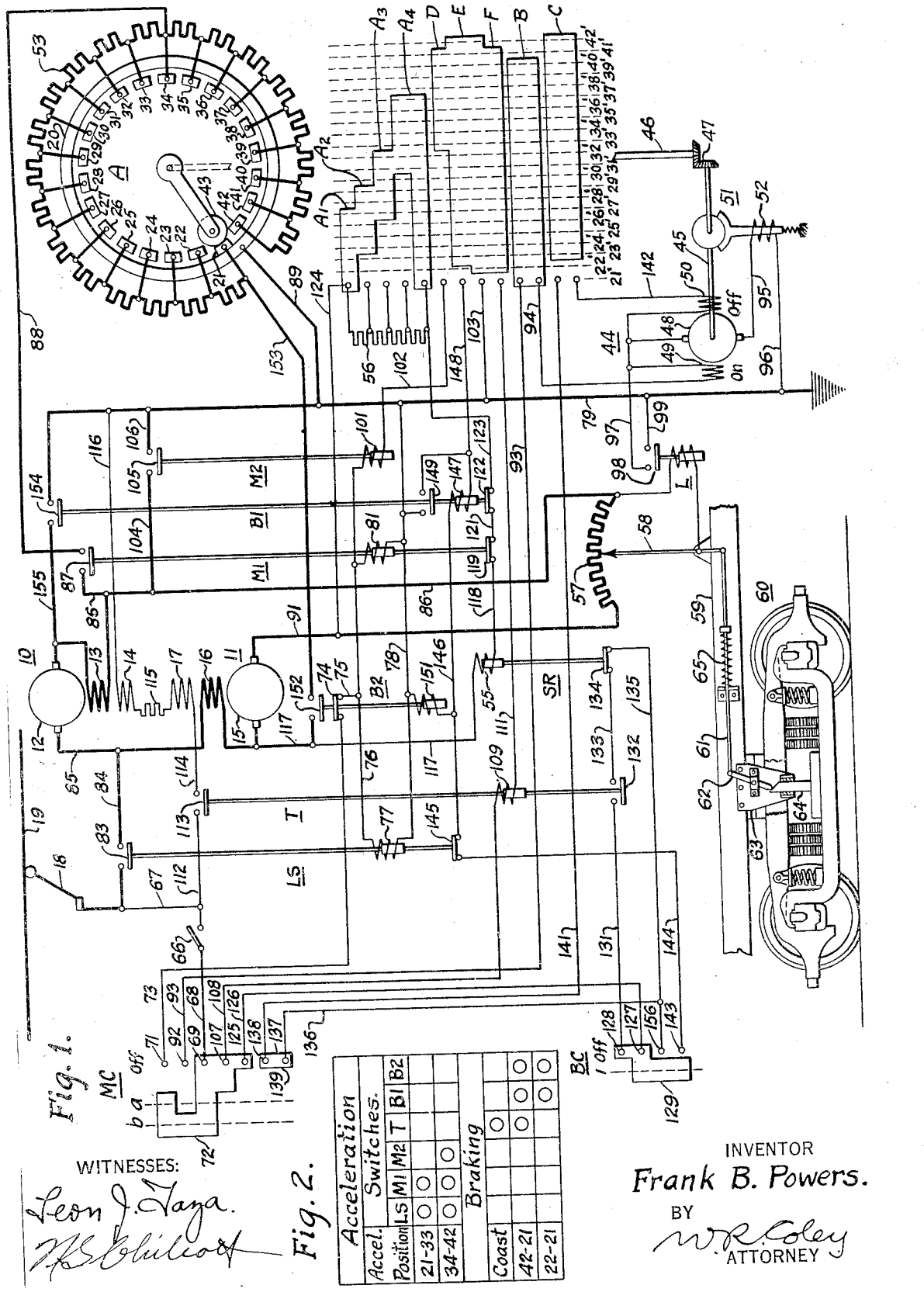

2,082,026

UNITED STATES PATENT OFFICE 2,082,026

MOTOR CONTROL SYSTEM

Frank B. Powers, Wilkinsburg, Pa., assignor to Westinghouse Electric & Manufacturing Company, East Pittsburgh, Pa., a corporation of Pennsylvania Application August 29, 1936, Serial No. 98,438

8 Claims. (Cl. 172—179)

My invention relates, generally, to motor control systems, and more particularly, to systems for controlling the acceleration and the deceleration of electrically propelled vehicles.

An object of my invention, generally stated, is to provide a system for automatically controlling both the acceleration and the deceleration of an electrically propelled vehicle which shall be simple and efficient in operation, and which may be economically manufactured and installed.

A more specific object of my invention is to provide for maintaining predetermined rates of acceleration and deceleration of a vehicle regardless of the load on the vehicle.

Another object of my invention is to provide for regulating the motor current during both the acceleration and the deceleration of a vehicle in accordance with the load on the vehicle.

Other objects of my invention will be explained fully hereinafter or will be apparent to those skilled in the art.

According to the preferred embodiment of my invention, both the acceleration and the deceleration of the propelling motors of an electric vehicle are controlled by an accelerator of the type described in Patent No. 1,991,229, issued February 12, 1935, to L. G. Riley and assigned to the Westinghouse Electric & Manufacturing Company. The accelerator is driven by a pilot motor under the control of a current limit relay which is responsive to the main motor current. Substantially constant rates of acceleration and deceleration are maintained regardless of load conditions by adjusting the setting of the limit relay in accordance with the load by means of a variable-load mechanism interposed between the car body and one of the vehicle trucks. The mechanism comprises a movable arm which is so connected to a variable shunt in the motor circuit that the current in the coil of the limit relay is varied in accordance with the distance between the car body and the truck, and, therefore, in accordance with the load on the vehicle.

For a fuller understanding of the nature and objects of the invention, reference may be had to the following detailed description, taken in conjunction with the accompanying drawing, in which:

Figure 1 is a diagrammatic view of a control system embodying the invention, and Fig. 2 is a chart, showing the sequence of operation of a portion of the apparatus illustrated in Fig. 1.

Referring to the drawing, electric motors 10 and 11 may be utilized for propelling a vehicle only a portion of which is shown. The motor 10 is provided with an armature winding 12, a series field winding 13, and a separately excited field winding 14. Likewise, the motor 11 is provided with an armature winding 15, a series field winding 16 and a separately excited field winding 17. The field windings 14 and 17 are utilized during dynamic braking to assure that braking action will take effect quickly.

An electrically operated line switch LS is provided for connecting the motors 10 and 11 to a trolley 18, which engages a power conductor 19 that may be energized from any suitable source of power such as a generating station (not shown). Energization of the separately excited field windings 14 and 17 is controlled by switch T, which is closed to connect these field windings to the trolley 18 during coasting and dynamic braking of the vehicle.

Both the acceleration and the deceleration of the motors 10 and 11 is primarily controlled by a motor driven accelerator A, which is of the same general type as the one described in the aforementioned Patent No. 1,991,229. The accelerator A comprises a circular copper bus 20 inside of which are disposed a plurality of contact fingers 21 to 42, inclusive, which are progressively forced against the bus 20 by a revolving roller 43.

The roller 43 is driven by a pilot motor 44 through shafts 45 and 46 connected by beveled gears 47. The pilot motor 44 is provided with an armature winding 48 and two field windings 49 and 50, one for each direction of rotation. A spring actuated brake 51 is provided for stopping the motor 44, a brake release coil 52 being connected in series with the armature winding 48 of the pilot motor and is, therefore, deenergized when the motor is deenergized.

The accelerator A is provided with a resistor 53 that is divided into a number of sub-divisions which are connected to the contact fingers 21 to 42, inclusive. A major portion of the resistor 53 is connected in the armature circuits of the motors 10 and 11 and is utilized to control the armature current during acceleration of the vehicle. The entire resistor 53 may be utilized to control the current flowing in the motor circuit during dynamic braking.

As shown, a number of cam switches A1, A2, A3, A4, B, C, D, E and F are located in the accelerator and are actuated by the shaft 46. The reference numerals 21' to 42', inclusive, indicate the contact fingers over which the roller 43 travels while the cam switches are closed. The function of the various cam switches will be explained more fully hereinafter.

In addition to the accelerator and the cam switches, several other switches are provided for performing certain switching operations. These switches include a switch M1 for connecting the motors 10 and 11 to the resistor 53 during acceleration, a switch M2 for connecting one terminal of the motors directly to ground after a major portion of the resistor 53 has been shunted from the motor circuit by the accelerator roller 43, and switches B1 and B2 for establishing dynamic braking connections for the motors 10 and 11.

Drum controllers MC and BC are provided for controlling the motor connections during acceleration and braking, respectively. The controllers are electrically interlocked in the usual manner to prevent improper operation of the equipment.

In order to prevent a sudden rush of current upon the re-application of power or dynamic braking after coasting of the vehicle, a spotting relay SR is provided to change the position of the accelerator roller during coasting to approximately match the car speed. The shunt field windings 14 and 17 of the motors 10 and 11, respectively, are energized during coasting by the closing of the switch T to connect the shunt field windings to the power conductor 19. Therefore the motors develop a voltage which is proportional to the speed of the car.

Since the actuating coil 55 of the relay SR is connected across the armature of the motor 11, the relay is responsive to the speed of the car. As the speed decreases, the contact members of the relay are closed, thereby causing the pilot motor 44 to return the accelerator roller toward the first contact finger. The backward movement of the accelerator operates one of the cam switches A1, A2, A3 or A4 to cut a portion of a resistor 56 out of the relay coil circuit. The contact members of the relay are then opened, holding the accelerator until the car speed has been further reduced, when the accelerator is again moved backward by the closing of the relay contacts. This operation is repeated until the master controller is moved out of the coasting position, or until the accelerator is returned to the first position.

A current limit relay L functions to control the motor current both during acceleration and dynamic braking by regulating the operation of the accelerator A. The contact members of the limit relay are disposed to shunt the armature of the pilot motor 44 when closed, thereby stopping the accelerator.

With a view toward maintaining a substantially constant rate of acceleration regardless of load conditions on the vehicle, I provide a means for adjusting the setting of the limit relay L in accordance with the load on the vehicle. As shown, the actuating coil of the limit relay L is connected across a variable shunt 57 by means of a movable arm 58 disposed to engage the shunt 57. Since the shunt 57 is connected in the motor circuit, the limit relay L is responsive to the motor current and the proportionate amount of current passing through the coil of the limit relay may be varied by changing the position of the movable arm 58 on the shunt 57.

As shown, the movable arm 58 is pivotally mounted upon the frame structure 59 of the vehicle which is resiliently supported by a vehicle truck 60, which may be of any suitable construction. The arm 58 is so connected to a suitable linkage mechanism 61 that it is moved across the shunt 57 in accordance with the load carried by the vehicle. One end of the link 61 is connected to one end of a pivotally mounted bar 62, carried by a bracket 63 which is secured to the frame 59. The other end of the bar 62 is disposed to engage an inclined surface of a movable member 64 disposed between suitable guides on the bracket 63. The bottom of the member 64 rests upon a portion of the vehicle truck 60 which is not deflected by changes in the load carried by the truck. Thus, it will be seen that as the load on the vehicle is increased to depress the springs of the truck 60, the member 64 is pushed upwardly to actuate the arm 62 which, in turn, moves the arm 58 across the shunt 57. As the load decreases, allowing the springs of the truck to raise the frame 59 and the bracket 63, a spring 65 actuates the arm 58 in the opposite direction.

In order that the functioning of the foregoing apparatus may be more clearly understood, the operation of the system will now be described in more detail. Assuming that a control switch 66 has been closed, the motors 10 and 11 may be connected to the power source to start the vehicle by actuating the master controller MC to position "a" to close the switches LS and M1. The energizing circuit for the actuating coil of the switch LS may be traced from a power conductor 67, which is connected to the trolley 18 through the control switch 66, conductor 68, contact fingers 69 and 71 bridged by a contact segment 72 on the master controller MC, conductor 73, an interlock 74 on the switch B2, conductors 75 and 76, the actuating coil 77 of the switch LS and conductor 78 to the grounded conductor 79. The energizing circuit for the actuating coil for the switch M1 extends from the previously energized conductor 76 through the actuating coil 81 of the switch M1 and the conductor 78 to the grounded conductor 79.

The closing of the switches LS and M1 connects the motors 10 and 11 to the power source in parallel circuit relation and in series with a major portion of the resistor 53 in the accelerator A. The circuit through the motor 10 may be traced from the power conductor 67 through contact members 83 of the switch LS, conductors 84 and 85, the armature winding 12 and series field winding 13 of the motor 10, conductor 86, contact members 87 of the switch M1, conductor 88, the resistor 53, contact finger 21 which is compressed against the bus 20 by the roller 43 and conductor 89 to the grounded conductor 79. The circuit through the motor 11 extends from the conductor 85 through the series field winding 16 and armature winding 15, a conductor 91, the shunt 57, and the conductor 86 to the contact members 87 of the switch M1 and thence through the circuit previously traced to the grounded conductor 79. Since a major portion of the resistor 53 is connected in series with the motors, the vehicle will be operated at a slow rate of speed.

If it is desired to accelerate the vehicle, the master controller MC may be actuated to position "b" thereby energizing the pilot motor 44, which operates the roller 43 to cut the resistor 53 out of the motor circuit, the operation of the motor 44 being under the control of the limit relay L, as will be explained more fully hereinafter. The energizing circuit for the pilot motor 44 may be traced from a contact finger 92 which engages the contact segment 72 of the controller MC through conductor 93, cam switch B of the accelerator A, conductor 94, the field winding 49 of the pilot motor 44, the armature winding 48, conductor 95, the release coil 52 of the brake 51 and conductor 96 to the grounded conductor 79. As explained hereinbefore, the energization of the coil 52 releases the brake 51 which permits the motor 44 to operate the accelerator A.

The rotation of the roller 43 compresses the contact fingers on the accelerator against the bus 20 to shunt the resistor 53 from the motor circuit. The shunting of a portion of the resistor 53 will permit the motor current to increase to a value which will operate the limit relay L to establish a shunt circuit around the armature of the motor 44 and the brake release coil 52, thereby stopping the accelerator. This shunt circuit may be traced from one terminal of the armature 48 through conductor 97, contact member 98 on the limit relay L and conductor 99 to the grounded conductor 79. When the main motors have accelerated to a speed which will cause the motor current to be reduced to a value that will permit the relay L to open its contact members, the pilot motor 44 advances the accelerator to cut more resistance out of the main motor circuit, thereby causing the motors to be accelerated still further.

In the event that the load on the vehicle is increased, which would normally cause the rate of acceleration to be decreased, the variable load mechanism associated with the truck 60 causes the arm 58 to be moved toward the right on the shunt 57, thereby decreasing the proportionate amount of motor current which passes through the actuating coil of the limit relay L. In this manner, the motors 10 and 11 are supplied with a higher value of current before the limit relay L operates to stop the progression of the accelerator A, thereby maintaining the accelerating rate of the vehicle at a substantially constant rate regardless of the load on the vehicle, within the limits of the capacity of the motors 10 and 11. Should the load on the vehicle be decreased below a predetermined amount, the arm 58 is moved towards the left on the shunt 57 which increases the energizing current for the limit relay L, thereby decreasing the amount of current supplied to the motors 10 and 11 and preventing the vehicle from being accelerated above its normal rate because of the decrease in load. Thus, it will be seen that the variable load feature automatically adjusts the setting of the limit relay L in accordance with the load carried by the vehicle.

This operation is continued until the accelerator roller 43 reaches the contact finger 33, at which time the cam switch D is closed to energize the actuating coil of the switch M2. The energizing circuit for the coil of the switch M2 may be traced from the previously energized conductor 76 through the actuating coil 101, conductor 102, the cam switch D and conductor 103 to the grounded conductor 79. The closing of the switch M2 connects the motors 10 and 11 directly to ground through a circuit which extends from the conductor 86 through conductor 104, contact members 105 and conductor 106 to the grounded conductor 79, thereby causing maximum voltage to be applied to the motors.

However, the pilot motor 44 will continue to advance the roller 43 to the contact finger 42 in order that the full amount of the resistor 53 will be available for controlling the motor conductor during dynamic braking of the motors. The advancement of the roller 43 is stopped by the opening of the cam switch B to deenergize the pilot motor 44.

Assuming that it is desired to permit the vehicle to coast, the master controller MC may be actuated to the "off" position, thereby opening the switches LS, M1 and M2 to disconnect the motors 10 and 11 from the power source. At this time, the switch T is closed to connect the field windings 14 and 17 to the power source, thereby separately exciting these windings and causing the motors 10 and 11 to generate a voltage proportional to the speed of the vehicle. The energizing circuit for the actuating coil of the switch T may be traced from the contact finger 107, which engages the contact segment 72, conductor 108, the actuating coil 109 of the switch T, conductor 111, the cam switch F and conductor 103 to the grounded conductor 79. The circuit through the field windings 14 and 17, established by the closing of the switch T, may be traced from the power conductor 67 through conductor 112, contact members 113 of the switch T, conductor 114, the field windings 17, a resistor 115, the field winding 14 and conductor 116 to the grounded conductor 79.

As described hereinbefore the relay SR, which is connected across the armature of the motor 11, functions to match the position of the roller 43 on the accelerator A with the speed of the vehicle, in order that the proper amount of the resistor 53 will be available for controlling the motor current in the event that dynamic braking is established. The energizing circuit for the actuating coil of the relay SR may be traced from one terminal of the armature winding 15 of the motor 11 through a conductor 117, the actuating coil 55 of the relay SR, conductor 118, an interlock 119 on the switch M1, conductor 121, an interlock 122 on the switch B1, conductor 123, the resistor 56 and conductors 124 and 81 to the other terminal of the armature winding 15.

When the vehicle is coasting at a relatively high speed, energization of the relay SR causes its contact members to be opened and the accelerator roller 43 remains on the last contact finger 42. As the speed of the vehicle decreases, the voltage produced by the motor 11 will decrease and the contact members of the relay SR are permitted to close, thereby causing the pilot motor 44 to operate the accelerator roller 43 in a counter-clockwise direction. The energizing circuit for the pilot motor 44 may be traced from a contact finger 125 on the master controller MC through conductor 126, contact fingers 127 and 128 bridged by a segment 129 on the braking controller BC, conductor 131, an interlock 132 on the switch T, conductor 133, contact members 134 on the relay SR, conductors 135 and 136, contact fingers 137 and 138 bridged by segment 139 on the controller MC, conductor 141, the cam switch C on the accelerator A, conductor 142, the field winding 50 and the armature winding 48 of the pilot motor 44, conductor 95, the brake coil 52 and conductor 96 to the grounded conductor 79.

As previously explained, the backward movement of the accelerator A causes the cam switch A4 to cut a portion of the resistor 56 out of the circuit for the actuating coil of the spotting relay SR thereby causing the contact members of the relay to be opened to stop the accelerator until the speed of the vehicle has decreased still further, when the foregoing operation is repeated. In this manner, the spotting relay SR and the cam switches A1 to A4, inclusive, cooperate to match the position of the accelerator roller with the speed of the vehicle, thereby ensuring that the proper amount of resistance 53 will be available to control the motor current in the event that dynamic braking is established or power is applied to the motors 10 and 11 by reconnecting them to the power source.

If it is desired to decelerate the vehicle by means of dynamic braking, the braking controller BC may be actuated to position "1" to close the switches B1 and B2 to establish dynamic braking connections, provided the controller MC is in the "off" position. The energizing circuit for the actuating coil of the switch B1 may be traced from a contact finger 143 which engages the contact segment 129 through conductor 144 an interlock 145 on the switch LS, conductor 146, the actuating coil 147 of the switch B1, conductor 148, the cam switch E and conductor 103 to the grounded conductor 79. A holding circuit for the coil 147 is established through an interlock 149 by the closing of the switch B1. The holding circuit may be traced from the conductor 148 through the interlock 149 and the conductor 78 to the grounded conductor 79. The energizing circuit for the actuating coil of the switch B2 extends from the previously energized conductor 146 through the actuating coil 151 of the switch B2 and the conductor 78 to the grounded conductor 79.

The closing of the switches B1 and B2 establishes dynamic braking connections for the motors 10 and 11, whereby the series field winding of one motor is connected across the armature winding of the other motor in a manner to cause the motors to function as generators to retard the movement of the vehicle. The circuit for the motor 10 may be traced from one terminal of the armature winding 12 through conductor 85, the field winding 16 of the motor 11, conductor 117, contact members 152 of the switch B2, conductor 153, the resistor 53, the contact finger 42, assuming that the accelerator roller 43 is on the finger 42, the bus 20, conductors 89 and 79, contact members 154 of the switch B1 and conductor 155 to the other terminal of the armature winding 12. The circuit for the motor 11 may be traced from one terminal of the armature winding 15 from the conductor 117, the contact members 152 of the switch B2, conductor 153, the resistor 53, contact finger 42, the bus 20, conductors 89 and 79, contact members 154 of the switch B1, conductor 155, the field winding 13, conductor 86, the shunt 57 and conductor 91 to the other terminal of the armature winding 15.

Since the switch T was closed when the master controller MC was actuated to the "off" position, the field windings 14 and 17 of the motors 10 and 11, respectively, are also energized at this time, thereby ensuring that the circulating current builds up rapidly and the dynamic braking action takes effect quickly. The braking current is controlled by means of accelerator resistor 53 in the same manner as during acceleration of the motors, the operation of the pilot motor being under control of the limit relay L which is adjusted by means of the variable load device associated with the truck 60, as hereinbefore described. The pilot motor 44 is operated in a direction to cause the accelerator A to decrease the resistance in the dynamic braking circuit as the speed of the vehicle decreases. The energizing circuit for the pilot motor 44 extends from a contact finger 156 on the braking controller BC which is connected to the conductor 135 and thence to the pilot motor 44 through the circuit previously traced.

Since the shunt 57 is connected in the motor circuit during dynamic braking, the variable load device on the truck 60 functions to adjust the setting of the limit relay L in accordance with the load on the vehicle and the relay L governs the motor current to maintain a substantially constant rate of deceleration in the same manner as during the acceleration of the vehicle.

From the foregoing description, it is apparent that I have provided for maintaining substantially constant rates of acceleration and deceleration of an electrically propelled vehicle regardless of changes in the load upon the vehicle within predetermined load limits.

I do not desire to be restricted to the specific embodiment of my invention herein shown and described, since it is evident that it may be changed and modified without departing from the spirit and scope of my invention as defined in the appended claims.

I claim as my invention:

1. In a motor control system, in combination, a motor for propelling a vehicle, resistance varying means for controlling the motor current, means for operating said resistance varying means, a current limit relay responsive to the motor current for controlling the operation of said operating means, and means actuated in accordance with the load on the vehicle for varying the proportionate amount of the motor current passing through said relay.

2. In a motor control system, in combination, a motor for propelling a vehicle, resistance varying means for controlling the motor current, means for operating said resistance varying means, a current limit relay for controlling the operation of said operating means, a variable shunt disposed in the motor circuit for energizing the limit relay proportionally to the motor current, and means actuated in accordance with the load on the vehicle for varying said shunt to change the proportionate amount of the motor current passing through said relay.

3. In a motor control system, in combination, a motor for propelling a vehicle, resistance varying means for controlling the motor current during acceleration of the vehicle, switching means for establishing dynamic braking connections for the motor to decelerate the vehicle, said resistance varying means being utilized to control the motor current during dynamic braking, means for operating said resistance varying means, current responsive means for controlling the operation of said operating means, and means actuated in accordance with the load on the vehicle for changing the setting of said current responsive means.

4. In a motor control system, in combination, a motor for propelling a vehicle, resistance varying means for controlling the motor current during acceleration of the vehicle, switching means for establishing dynamic braking connections for the motor to decelerate the vehicle, said resistance varying means being utilized to control the motor current during dynamic braking, means for operating said resistance varying means, current responsive means for controlling the operation of said operating means, and means mechanically actuated by variations in the load on the vehicle for varying the motor current required to operate said current responsive means.

5. In a motor control system, in combination, a motor for propelling a vehicle, resistance varying means for controlling the motor current during acceleration of the vehicle, switching means for establishing dynamic braking connections for the motor to decelerate the vehicle, said resistance varying means being utilized to control the motor current during dynamic braking, means for operating said resistance varying means in one direction during acceleration of the vehicle, means responsive to the motor current for controlling the operation of said operating means, and means mechanically actuated by variations in the load on the vehicle for varying the proportionate amount of motor current passing through said current responsive means.

6. In a motor control system, in combination, a motor for propelling a vehicle, resistance varying means for controlling the motor current during acceleration of the vehicle, switching means for establishing dynamic braking connections for the motor to decelerate the vehicle, said resistance varying means being utilized to control the motor current during dynamic braking, a pilot motor for operating said resistance varying in one direction during acceleration and in the opposite direction during deceleration of the vehicle, relay means responsive to the motor current for controlling the operation of the pilot motor, and means mechanically actuated by variations in the load on the vehicle for changing the setting of the relay means.

7. In a motor control system, in combination, a motor for propelling a vehicle, resistance varying means for controlling the motor current during acceleration of the vehicle, switching means for establishing dynamic braking connections for the motor to decelerate the vehicle, said resistance varying means being utilized to control the motor current during dynamic braking, a pilot motor for operating said resistance varying in one direction during acceleration and in the opposite direction during deceleration of the vehicle, a current limit relay for controlling the operation of the pilot motor, a shunt disposed in the motor circuit for energizing the limit relay proportionally to the motor current, and means mechanically actuated by variations in the load on the vehicle for varying said shunt to change the proportionate amount of the motor current passing through said relay.

8. In a motor control system, in combination, a motor for propelling a vehicle, resistance varying means for controlling the motor current during acceleration of the vehicle, switching means for establishing dynamic braking connections for the motor to decelerate the vehicle, said resistance varying means being utilized to control the motor current during dynamic braking, a pilot motor for operating said resistance varying in one direction during acceleration and in the opposite direction during deceleration of the vehicle, a current limit relay for controlling the operation of the pilot motor, a variable shunt disposed in the motor circuit for energizing the limit relay proportionally to the motor current, a movable arm for varying said shunt, and means for actuating said arm in accordance with the load on the vehicle to control the energization of said relay.

FRANK B. POWERS.